United States Patent [19]

Kuhn et al.

[11] 4,286,402

[45] Sep. 1, 1981

[54] FISHING LURE RETRIEVER

[76] Inventors: J. Bruce Kuhn, 4931 Coldwater Canyon, Apt. 12, Sherman Oaks, Calif. 91423; Klaus P. Utecht, 833 Lamplight Dr., La Jolla, Calif. 92037; Ronald K. Harris, 11480 Amanda Dr., Studio City, Calif. 91604

[21] Appl. No.: 57,337

[22] Filed: Jul. 13, 1979

[51] Int. Cl.[3] ............................................. A01K 97/00
[52] U.S. Cl. .................................................... 43/17.2
[58] Field of Search ............... 43/17.2, 5, 43.14, 27.2, 43/42.31; 294/66 R

[56] References Cited

U.S. PATENT DOCUMENTS

| | | | |
|---|---|---|---|
| 1,858,550 | 5/1932 | Kahle | 43/43.14 |
| 2,627,691 | 2/1953 | Bress | 43/17.2 |
| 2,761,235 | 9/1956 | Payne | 43/17.2 |
| 2,765,567 | 10/1956 | Fifer | 43/17.2 |
| 2,807,905 | 10/1957 | Ford | 43/17.2 |
| 3,012,355 | 12/1961 | Cottrell | 43/17.2 |
| 3,382,599 | 5/1968 | Beverley | 43/17.2 |
| 3,466,787 | 9/1969 | Collins | 43/42.31 |

*Primary Examiner*—Stephen G. Kunin
*Assistant Examiner*—K. Bradford Adolphson
*Attorney, Agent, or Firm*—Eric T. S. Chung

[57] ABSTRACT

An improved fishing lure retriever designed to be easily and quickly connected to a fishing line and lowered to retrieve an artificial fishing lure that has become snagged on an underwater object is provided. The subject fishing lure retriever is characterized by a hollow cylindrical body in the shape of a canister that is partially filled with shot or the like. A plurality of link chains extend from the leading end of the retriever to engage fishing hooks attached to the lure. The trailing end of the retriever is provided with an aperture to enable the retriever to be connected to an auxiliary drop line that allows the retriever to be lowered underwater. Slotted eyelets are situated on generally opposite ends of the retriever to serve as guides when associated with a fishing line to which a snagged lure is attached.

2 Claims, 5 Drawing Figures

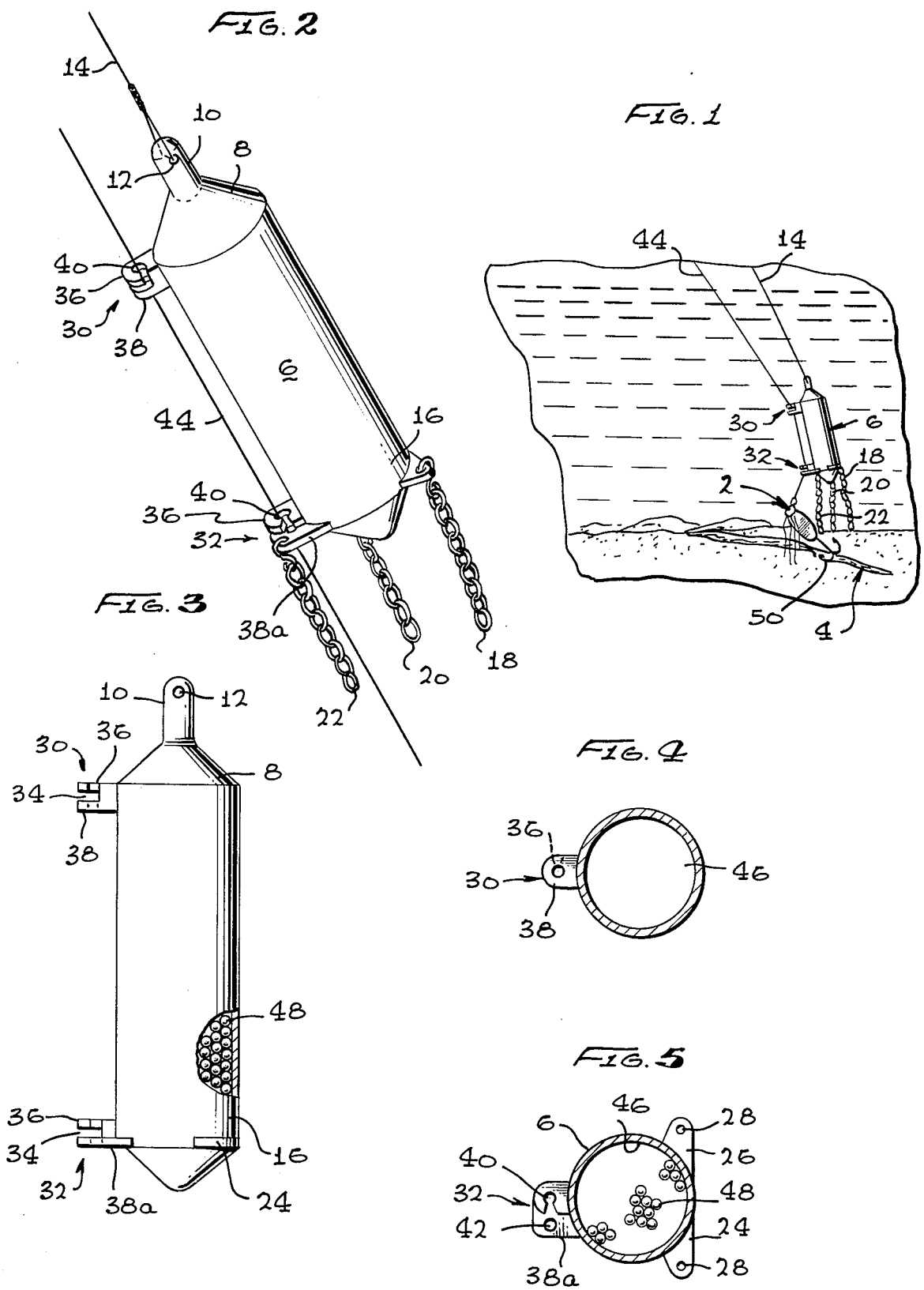

FISHING LURE RETRIEVER

BACKGROUND OF THE INVENTION

1. Field of the Invention

This invention generally relates to fishing equipment and more specifically devices that are designed to free and retrieve fishing lures that may become snagged or caught on an underwater article.

2. Description of the Prior Art

Fishing lures are used by fishermen when spin casting. In simple terms, a fishing lure may be a shiny metallic object designed to spin when pulled underwater. One or more single or multiple fishing hooks may be attached to the fishing lure and be a part thereof. Spin casting generally involves a fisherman casting his lure and line into a river or lake and then slowly reeling it back in. Fish are attracted by the lure. Normally, the weight of the lure and additional sinkers, when used, will cause the lure to sink towards or to the bottom of the river or lake. As this happens and as the lure is being reeled in it may become snagged on rocks or debris on the bottom of the river or lake. Normally, there is no way of retrieving the lure once the fishing hook and/or lure has become snagged. From time-to-time a fishing hook may be dislodged or freed simply by yanking on the fishing line. Most of the time a fisherman will simply reel the fishing line in until it snaps, resulting in the loss of the lure.

Over the years, numerous prior art devices have been designed, by fishermen especially, to enable snagged fishing lures to be freed and saved. Like everything else, many of such devices have only limited utility, that is, they can be successfully used on occasion; but all to frequently fail to accomplish what the retrievers were designed to do. Other prior art devices are either too fragile, complicated, or expensive and are therefore unattractive to fishermen in a practical sense.

It is thus the intention of the present invention to provide an improved fishing lure retriever that can be used to successfully retrieve fishing lures that may become snagged on underwater rocks or debris.

OBJECTS AND SUMMARY OF THE INVENTION

Accordingly, it is the object of the present invention to provide a fishing lure retriever that is efficient, simple and economically feasible.

It is another object of the present invention to provide a fishing lure retriever that may be easily employed by a fisherman in a variety of circumstances and without requiring the assistance of another person.

It is yet another object of the present invention to provide a fishing lure retriever that is compact, safe to use, easily stored and carried by a fisherman, and not requiring special mechanical maintenance procedures.

It is a further object of the present invention to provide a fishing lure retriever that works.

Briefly described, the present invention is a fishing lure retriever that is designed to be lowered by the use of a guy line to a snagged lure to have the lure jostled free and/or entangled with the retriever to permit the lure to be yanked free by the retriever.

More particularly, the subject invention involves a hollow cylindrical canister that is partially filled with metal shot. A plurality of link chains are suspended from, and attached to, the leading edge of the canister while the trailing end of the canister is designed to be attached to a guy line. A pair of eyelet guides are formed on opposite ends of the side surface of the canister to allow the retriever to be associated with a fishing line and thereby be lowered to a snagged lure.

The features that characterize the novelty of the present invention are set forth with particularity in the appended claims. Both the organization and manner of operation of the invention, as well as other objects and the attendant advantages thereof may be best understood by reference to the drawings, wherein like reference symbols designate like parts throughout the figures therein.

BRIEF DESCRIPTION OF THE DRAWINGS

FIG. 1 is a schematic diagram illustrating a fishing lure retriever in accordance with the present invention which has been lowered underwater to a snagged fishing lure.

FIG. 2 is a schematic diagram illustrating a perspective view of a fishing lure retriever in accordance with the present invention as it would appear when associated with a fishing line to which a snagged fishing lure is attached.

FIG. 3 is a schematic diagram illustrating a partially fragmented side-view of a fishing lure retriever in accordance with the present invention wherein the metallic shot housed within the hollow interior chamber of the retriever is exposed.

FIGS. 4 and 5 are schematic diagrams illustrating trailing and leading cross-sectional views, respectively, of the retriever shown in FIG. 3.

DESCRIPTION OF THE PREFERRED EMBODIMENT

An improved fishing lure retriever, in accordance with the present invention is illustrated in FIG. 1 of the drawings. The retriever is operatively positioned to retrieve a fishing lure 2, which has become snagged on underwater debris 4.

Referring also to FIG. 2, the fishing lure retriever includes a body 6 having the shape of a cylindrical canister. The trailing end 8 of the body 6 is shaped to have an elongate protuberance 10 having an aperture 12 therein to which a guy line 14 can be attached for the purpose of lowering the retriever underwater and raising it in the course of its operation. The leading end 16 of the body is provided with a plurality of link chains 18, 20 and 22 each of which may be four to five inches long. The link chains 18, 20 and 22 may be attached to the leading end 16 of the body in any appropriate manner. For example, with additional reference to FIG. 5, the link chains 18 and 22 may be connected to the leading end of body 6 by the use of flange or wing sections 24 and 26, respectively, each of which is provided with a hole 28, through which the chains 18 and 20 can be threaded and thereby secured.

Slotted eyelets 30 and 32 are situated and mutually aligned along a side face of the body 6 more specifically, the slotted eyelet 30 is situated towards the trailing end 16 of the body 6.

The eyelets 30 and 32 are formed to have a slot 34, separating oppositely directed hook sections 36 and 38, which in combination generally form an aperture 40, the interior of which is accessible through the slot 34.

The slotted eyelet 32 differs slightly from the eyelet 30 by having the hooked portion 38a slightly enlarged to provide a flange or wing section in the fashion of the wing sections 24 and 26, such that the link chain 22 can be secured thereto by the use of an aperture 42.

As shown in FIGS. 1 and 2, the eyelets 30 and 32 serve to have the retriever associated with a fishing line 44 such that the retriever can be lowered through the use of the guy line 14 to the fishing lure 2.

The interior of the body 6 of the canister is hollowed to form an interior cavity 46 extending generally for the length of the body 6. Metallic shot 48 may be used to partially fill the interior cavity 46. As an example, approximately three-fourths of the interior cavity 46 may be filled with the metallic shot 48. The diameter of the shot 48 may be in the neighborhood of one-sixteenth inch. The actual size of the shot is not crucial to the invention or the operation thereof as long as the shot can be housed in the interior cavity 46 and be easily moved therewithin.

The body 6 of the lure retriever may be manufactured by using any of the conventional techniques and using any suitable material such as a plastic, a synthetic, or even metal.

Operationally, the shot 48 provides sufficient weight in combination with the body 6 of the retriever and the link chain 18, 20 and 22 to have the retriever sink towards a snagged fishing lure 2 when associated with a fishing line 44, by having the fishing line 44 situated in the apertures 40 of the slotted eyelets 30 and 32. Upon the retriever reaching the location of a snagged lure 2, the guy line 14 may be yanked several times in quick succession having the retriever successively raised and lowered against the snagged lure 2 and thereby jostle the lure 2 to free it from the debris 4. Clearly, when the retriever is jerked by yanking on the guy line 14, the metallic shot 48 will move from one end to the other within the interior cavity 46. The striking of the forward end of the interior cavity 46 as the metallic shot 48 returns to the lower end of the interior cavity 46 after each yanking motion on the guy line 14 will cause a striking force which is applied to a snagged lure when contacted by the retriever. Such striking force, which may be likened to a "jackhammer" action when the retriever is yanked repeatedly, produces the desired jostling of a snagged lure in the effort to free the lure. In conjunction with such jostling it is also possible to have the link chains 18, 20 and 22 become entangled with the one or more fish hooks 50 attached to the lure 2. Once one or more of the link chains 18, 20 and 22 become entangled with one or more of the fish hooks 50, the retriever simply may be raised through the use of the guy line 14 to have the fish hook 50 and the lure 2 pulled free from the debris 4. A user would be able to determine that one or more of the chains 18, 20 and 22 become entangled with the lure 2 and/or the fish hook 50 by feeling the resistance when the guy line 14 is retracted.

It is now clear from the foregoing description that the present invention provides a simple and compact, fishing lure retriever which is designed to be easily and economically manufactured and readily employed for its intended purpose.

While a preferred embodiment of the present invention has been described hereinabove, it is intended that all matter contained in the above description and shown in the accompanying drawings be interpreted as illustrative and not in a limiting sense, and that all modifications, constructions and arrangements which fall within the scope and spirit of the invention be made.

What is claimed is:

1. A fishing lure retriever comprising:
    an elongate body having a fully enclosed interior cavity extending for the length of said body, said body having a leading end and a trailing end, said leading end and said trailing end of said body having a conical shape, the apexes of said conically-shaped ends being directed in opposite directions away from said body;
    a plurality of chain members attached at one end thereof to said leading end of said body;
    aperture means for permitting a guy line to be attached to said trailing end of said body, said aperture means formed on the trailing end of said body;
    a plurality of pellets contained in and partially filling said interior cavity;
    guide means for physically associating said body with a fishing line to which a lure being retrieved is connected, said guide means being situated on said body, said guide means including a pair of guides each including a pair of oppositely-directed juxtaposed hook members which are separated by a slot for receiving a fishing line with which said body is physically associated, said guides being aligned along a side surface of said body along a line that is parallel to the longitudinal axis of said body; and
    a plurality of ledge members connected to said leading end of said body at the base of said conically-shaped end, each ledge member receiving one of said chain members, said leading end of said body being lower than the trailing end of said body when the retriever is submerged in the course of operation.

2. The fishing lure retriever defined by claim 1, said pellets being a plurality of metal balls, said pellets filling more than one-half of said fully enclosed interior cavity; said retriever including three chain members each comprising a plurality of links, said chain members operating to entangle a lure in the process of retrieval whereby said shot produces a jostling force when moved from end to end within said interior cavity.

* * * * *